United States Patent
Karimli et al.

(10) Patent No.: US 11,632,702 B2
(45) Date of Patent: Apr. 18, 2023

(54) INTELLIGENT EVENT-BASED NETWORK ROUTING

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 34 days.

(21) Appl. No.: 15/674,246

(22) Filed: Aug. 10, 2017

(65) Prior Publication Data

US 2019/0053114 A1     Feb. 14, 2019

(51) Int. Cl.
*H04W 4/00*     (2018.01)
*H04W 36/14*    (2009.01)
*H04W 36/24*    (2009.01)
*H04W 88/06*    (2009.01)
*H04W 84/12*    (2009.01)
*H04W 36/32*    (2009.01)

(52) U.S. Cl.
CPC .......... *H04W 36/14* (2013.01); *H04W 36/245* (2013.01); *H04W 36/32* (2013.01); *H04W 84/12* (2013.01); *H04W 88/06* (2013.01)

(58) Field of Classification Search
CPC ... H04W 36/14; H04W 36/32; H04W 36/245; H04W 88/06
See application file for complete search history.

(56) References Cited

U.S. PATENT DOCUMENTS

| | | | |
|---|---|---|---|
| 6,711,408 B1* | 3/2004 | Raith | H04W 36/32 340/988 |
| 9,432,901 B1* | 8/2016 | Kwan | H04W 36/245 |
| 9,854,487 B2* | 12/2017 | Kotecha | H04W 36/18 |
| 2016/0366619 A1* | 12/2016 | Yang | H04W 36/0016 |
| 2017/0070923 A1* | 3/2017 | Li | H04W 36/0066 |
| 2019/0174368 A1* | 6/2019 | Decarreau | H04W 12/037 |

* cited by examiner

*Primary Examiner* — Bo Hui A Zhu
(74) *Attorney, Agent, or Firm* — Lee & Hayes, P.C.

(57) ABSTRACT

Intelligent event-based network routing is described herein. A device connected to a first network can determine an occurrence of an event and, responsive to determining the occurrence of the event, can determine contextual data associated with the event. The device can retrieve a data model that has been trained based on historical network usage data indicating one or more network usage patterns associated with the device, and can analyze the contextual data based at least in part on the data model to determine whether a change to a second network is warranted. Based on an output of the data model, the device can effectuate a change from the first network to the second network or refrain from effectuating a change from the first network to the second network. That is, intelligent event-based network routing can facilitate routing data communication based on user preferences to optimize user experience.

20 Claims, 4 Drawing Sheets

INTELLIGENT EVENT-BASED NETWORK ROUTING

BACKGROUND

Mobile devices can communicate with other mobile device(s), server(s), etc. using various network technologies. For instance, mobile devices can communicate via cellular networks (e.g., Global System for Mobile Communications (GSM), Universal Mobile Telecommunications System (UMTS), Long-term Evolution (LTE), etc.) and/or non-cellular networks (e.g., Wi-Fi, WIMAX, etc.). Often, cellular networks can become over populated causing latency and/or poor user experience. Accordingly, various service providers leverage features, such as Access Network Discover and Selection Function (ANDSF), Real-Time Traffic Steering, etc., to assist mobile devices in discovering non-cellular networks that can be used for communications and to provide mobile devices with rules for connecting to these non-cellular networks. In such examples, service providers are concerned with offloading traffic from the cellular networks to the non-cellular networks and such offloading often comes at the expense of the consumer. Additionally and/or alternatively, non-cellular network providers desire to maximize usage on the non-cellular networks and attempt to re-route traffic to non-cellular networks, which can come at the expense of the consumer. That is, often, offloading and/or re-directing traffic from a cellular network to a non-cellular network can cause a consumer to experience increased latency (e.g., due to a poor Wi-Fi connection and/or an overloaded Wi-Fi network) and/or an otherwise poor user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In examples of the present disclosure, intelligent event-based network routing is described. As described above, devices can communicate with other device(s), server(s), etc. using various network technologies (e.g., access technologies). For instance, devices can communicate via cellular networks (e.g., Global System for Mobile Communications (GSM), Universal Mobile Telecommunications System (UMTS), Long-term Evolution (LTE), etc.) and/or non-cellular networks (e.g., Wi-Fi, WIMAX, etc.). Often, cellular networks and/or non-cellular networks can become over populated causing latency and/or poor user experience. Techniques described herein are directed to intelligently routing device(s) between network(s) based on usage patterns of individual user(s) operating said device(s) to optimize user experience. That is, techniques described herein are directed to leveraging machine learning mechanism(s) to train a data model that can be configured to determine whether a network change is warranted. In some examples, a network change can cause data communications (or other types of communications) to be routed to a different type of network (e.g., a network associated with a different access technology), a different network of a same type of network (e.g., to a different network associated with the same access technology), etc.

In at least one example, techniques described herein can utilize the data model to analyze contextual data associated with event(s) to determine whether to route data communication transmitted from a device through a first network connection or a second network connection. As described herein, an event can correspond to a change in a location of a device (e.g., from outside of a coffee shop to inside of the coffee shop, from outside of a home to inside of the home, etc.), a change to an availability of a network (e.g., a network that was previously unavailable becomes available or a network that was previously available becomes unavailable), a user action (e.g., initiating a video call, opening a web browser, etc.), an activation of an application (e.g., launching a banking application, etc.), etc.

Based at least in part on determining an occurrence of an event, techniques described herein can determine contextual data associated with the event. Non-limiting examples of contextual data include location data indicating a location of a device, connectivity data indicating network quality (e.g., throughput, latency, availability, signal strength, etc.), user activity data indicating activity of the user with respect to one or more applications, security data indicating security associated with relevant network(s) (e.g., open network, verified network, private network, etc.) and/or application(s) (e.g., native application, downloaded application, etc.), service plan data indicating information associated with a service plan of a device (e.g., roaming information, data usage information, etc.), device component data associated with a device (e.g., useful battery life of a battery of the device, etc.), etc.

In an example, based on determining an occurrence of an event, technologies described herein are directed to determining contextual data, analyzing the contextual data using a previously trained data model, and determining whether a network change is warranted. That is, techniques described herein can be used to determine whether, based on previous usage patterns of a user, a device should change its connection from a first network to a second network to optimize the experience of the user. In some examples, techniques described herein can leverage one or more polices to determine whether effectuating the recommendation output by the data model is likely to provide an optimal experience for the user.

Figure 1:
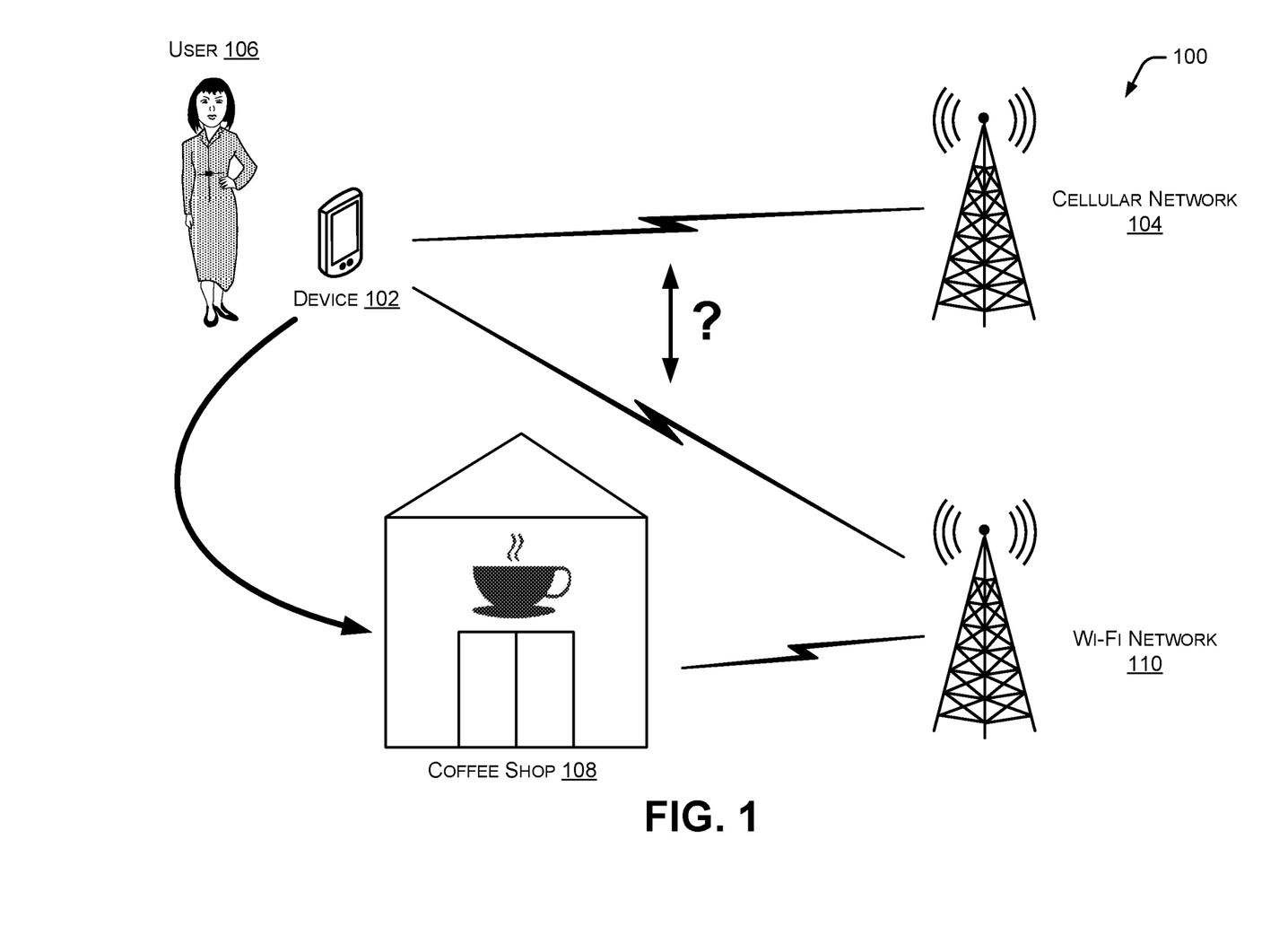
FIG. 1 illustrates an environment for intelligent event-based network routing.

FIG. 1 illustrates an environment 100 for intelligent event-based network routing. FIG. 1 is a non-limiting example of an implementation of techniques described herein. In FIG. 1, a device 102 can be connected to a cellular network 104. For instance, the cellular network 104 can be associated with a service provider providing telecommunication services to the device 102. In an example, a user 106 operating the device 102 can enter a coffee shop 108. The coffee shop 108 can be associated with a Wi-Fi network 110. The coffee shop 108 can enable patrons of the coffee shop to connect their devices to the Wi-Fi network 110 free of charge, for instance.

As described herein, the device 102 can determine an event associated with the user 106 (and the device 102) entering the coffee shop 108 and/or determining an availability of a new network (e.g., Wi-Fi network 110). Based on determining the event, the device 102 can determine contextual data associated with the event. For instance, the contextual data can indicate connectivity data associated with the cellular network 104 and the Wi-Fi network 110. Additionally, the contextual data can indicate security data indicating security associated with the cellular network 104 and the Wi-Fi network 110. Moreover, the contextual data can indicate user activity data indicating activity of the user 106 with respect to one or more applications associated with the device, service plan data associated with a service plan of the device 102, device component data indicating information about the device 102, etc. In at least one example, the device 102 can store a data model that is configured to determine whether a network change is warranted. That is, the device 102 can leverage the data model to analyze the contextual data to determine whether the device 102 should remain connected to the cellular network 104 or whether the device 102 should connect to the Wi-Fi network 110.

If the data model determines that, based on previous usage patterns, the user 106 prefers to use the Wi-Fi network 110 in the coffee shop 108 (or coffee shops in general), the device 102 can effectuate a change such that the device 102 is connected to the Wi-Fi network 110 instead of the cellular network 104. As a non-limiting example, the user 106 may be concerned about data usage and, therefore typically switches to Wi-Fi whenever a Wi-Fi network is available. Accordingly, in this example, a network change may be implemented and data communications can be routed through the Wi-Fi network 110 instead of the cellular network 104.

Conversely, if the data model determines that, based on previous usage patterns, the user 106 prefers to use the cellular network 104 in the coffee shop 108 (or in coffee shops in general), the device 102 can refrain from effectuating a change such that the device 102 remains connected to the cellular network 104, despite the availability of the Wi-Fi network 110. As a non-limiting example, the user 106 may prefer an optimal browsing experience and, instead of dealing with an overcrowded Wi-Fi network, for instance, the user 106 may typically remain on the cellular network 104 (despite having the option to switch to Wi-Fi network(s)). Accordingly, in this example, a network change may not be implemented and data communications can continue to be routed through the cellular network 104.

In some examples, one or more policies can be implemented to override (or confirm) an output of the data model. For instance, in an example, the data model can recommend that the device 102 change to the Wi-Fi Network 110; however, the latency and/or throughput (e.g., network connectivity) may be below a permissible threshold and/or a level of security required for a certain action to be performed via the device 102 may be above the level of security associated with the Wi-Fi network 110. Accordingly, the device 102 can refrain from connecting to the Wi-Fi network 110 and can remain connected to the cellular network 104. Additional details associated with the policy(s) are described below.

Additionally and/or alternatively, in some examples, the user 106 can provide input indicating which network she desires to use for transmitting data communications. For instance, the user 106 can provide input to connect to the Wi-Fi network 110 or remain on the cellular network 104. In an example, the data model can recommend the device 102 change to the Wi-Fi network 110; however, the user 106 can explicitly override the output of the data model and remain on the cellular network 104.

Of course, FIG. 1 is directed to but one example of how a data model can be used for intelligently routing network connections based on usage patterns of a user and additional and/or alternative examples can be imagined.

For instance, as another non-limiting example, data associated with a user can indicate that the user prefers to use a first Wi-Fi network for general web browsing but prefers to use a second Wi-Fi network for real-time communications (such as voice and/or video calling). In such an example, when a user initiates a real-time communication, the data model can indicate that, if the second Wi-Fi network is not being used, a switch to the second Wi-Fi network is warranted. Conversely, if a user is browsing the web, the data model can indicate that, if the device is connected to the second Wi-Fi network and the first Wi-Fi network is available, the device should switch to the first Wi-Fi network.

In an additional non-limiting example, data associated with a user can indicate that a user prefers to use a first streaming application with a Wi-Fi connection and a second streaming application with a cellular connection. Accordingly, when a user launches or otherwise interacts with the first streaming application, the data model can recommend that the device utilize a Wi-Fi network. If the device is connected to a cellular network, the device can effectuate a change to the Wi-Fi network. If the device is connected to a Wi-Fi network, the device can refrain from effectuating a change to a cellular network. And, when a user launches or otherwise interacts with the second streaming application, the data model can recommend that the device utilize a cellular connection. If the device is connected to a Wi-Fi network, the device can effectuate a change to a cellular network. If the device is connected to a cellular network, the device can refrain from effectuating a change to the Wi-Fi network.

As another non-limiting example, data associated with a user can indicate that when the user performs certain actions, the user prefers to use a cellular network (because the cellular network has a higher security level than Wi-Fi networks). In such an example, when the user activates a particular action (e.g., opening an online banking application), the data model can recommend that the device utilize the cellular network without regard to whether a Wi-Fi network is available.

Additional and/or alternative examples can be imagined, and are discussed herein.

Figure 2:
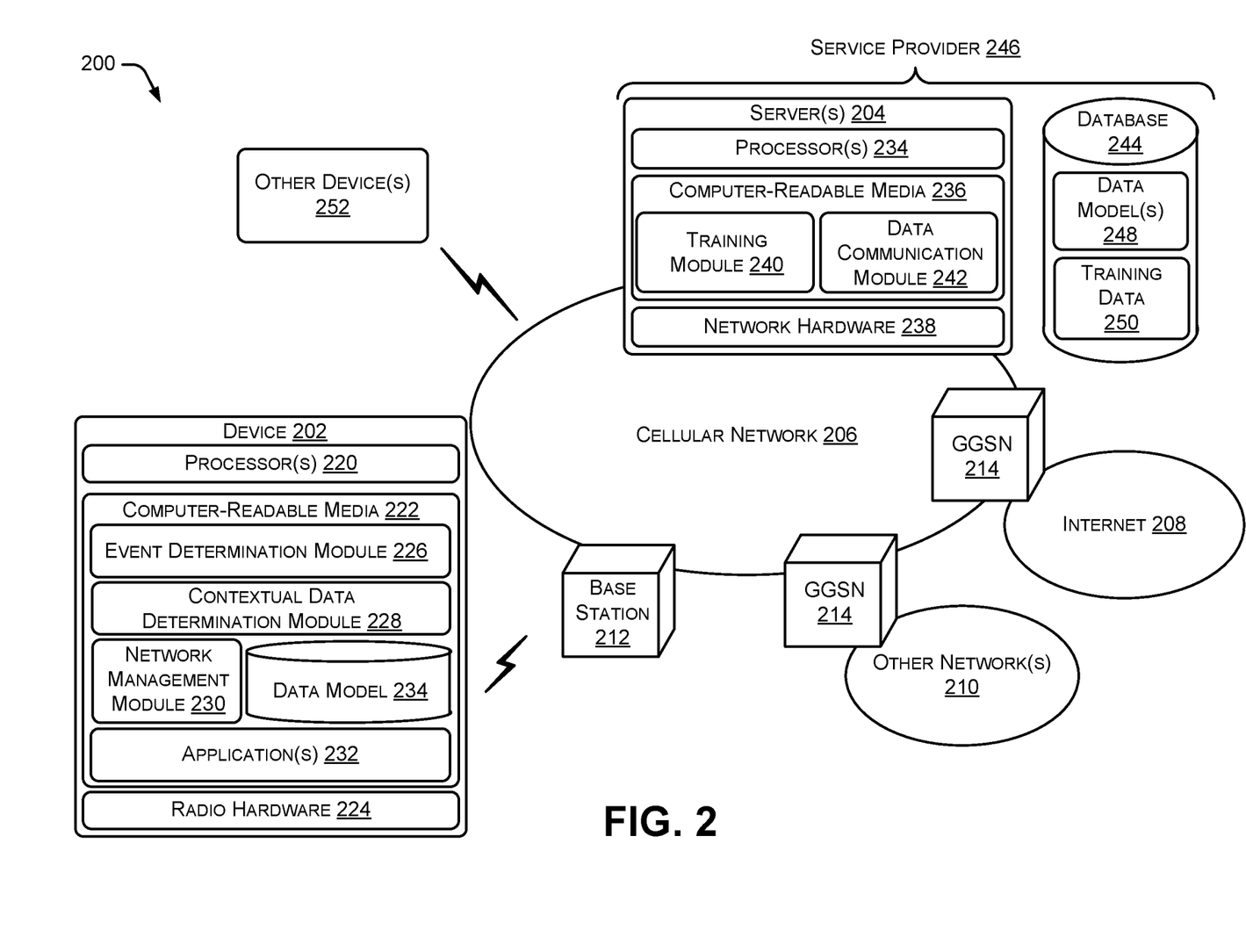
FIG. 2 illustrates an environment for intelligent event-based network routing.

FIG. 2 illustrates an environment 200 for intelligent event-based network routing. As illustrated, environment 200 includes a device 202 communicatively coupled to server(s) 204 via a cellular network 206, the internet 208, and/or one or more other networks 210. In at least one example, the device 202 can correspond to the device 102, described above with reference to FIG. 1. In some examples, device 202 can connect to the cellular network 206 via a corresponding base station 212. The cellular network 206 can be responsible for routing voice and/or data communication to other networks 210, as well as routing data communication to external packet switched networks, such as the internet 208. For example, the cellular network 206 can include a Gateway GPRS Support Node (GGSN) 214 and/or another equivalent node (e.g., packet data network gateway (PGW), etc.). For the purpose of this discussion, the device 202 can "switch" between networks and/or "change" networks by causing data communication to be routed from a first network to a second network. In some examples, the first network and the second network can be associated with same access technologies. In other examples, the first network and the second network can be associated with different access technologies.

Device 202 can be operated by a user (e.g., user 106 described above with reference to FIG. 1). The user can be an entity (e.g., person, company, etc.) that subscribes to services, such as telecommunication services, via a service plan. The service plan can indicate an amount of data, voice calling, and/or text messaging available to the device 202, whether data, voice calling, and/or text messaging is available internationally (or outside of a home coverage area), roaming charges associated with data, voice calling, and/or text messaging internationally (or outside of a home coverage area), data transmission speeds accessible to the device 202, etc. The service plan can be available to the account holder for a particular rate. In some examples, the service plan is active for a particular period of time (e.g., a two-year plan, a five-year plan, etc.).

The device 202 can be any device including, but not limited to, a smart phone, a personal digital assistant, a netbook, a laptop computer, a smart appliance, and/or another electronic device that is capable of sending or receiving voice, video, and/or data via the cellular network 206, the internet 208, and/or one or more other network(s) 210 (e.g., a Wi-Fi network, a WIMAX network, another access network, etc.). The device 202 can include processor(s) 220, computer-readable media 222, and radio hardware 224. The processor(s) 220 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 220 can execute one or more modules and/or processes to cause the device 202 to perform a variety of functionalities, as set forth above and explained in further detail in the following disclosure. Additionally, each of the processor(s) 220 can possess its own local memory, which also can store program modules, program data, and/or one or more operating systems.

Depending on the exact configuration and type of the device 202, the computer-readable media 222, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 222 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 202. Any such non-transitory computer-readable media can be part of the device 202.

In contrast, communication media includes computer readable instructions, data structures, program modules, or other data in a modulated data signal, such as a carrier wave, or other transmission mechanism. As defined herein, computer storage media does not include communication media.

The computer-readable media 222 can include one or more modules and data structures including, for example, an event determination module 226, a context data determination module 228, a network management module 230, and one or more applications 232. The one or more modules and data structures can be in the form of stand-alone applications, productivity applications, an operating system component, or any other application or software module configured to facilitate event-based network routing, as described herein.

The event determination module 226 can determine an occurrence of an event. In at least one example, an event can correspond to a change in a location of the device 202. For instance, a Global Positioning System (GPS) sensor can generate location data, which can identify a location of the device 202. In at least one example, the event determination module 226 can determine that the location of the device 202 changes a threshold amount (e.g., the device 202 moves a threshold distance) and therefore can determine an event. Additionally and/or alternatively, the event determination module 226 can compare location data indicating a location of the device 202 with known location data associated with various entities to determine whether the device 202 is located at a particular entity (e.g., a coffee shop, a book store, etc.). For instance, the event determination module 226 can determine that the location data associated with the device 202 corresponds to a location within a geo-fence corresponding to the particular entity.

Additionally and/or alternatively, an event can correspond to a change to an availability of a network. For instance, the event determination module 226 can receive a signal and/or detect a presence of a network that was not previously available (e.g., has not been available for a threshold period of time). Or, the event determination module 226 can determine an absence of a signal and/or determine an absence of a network that was previously available (e.g., the signal and/or network is not detected for a threshold period of time). In some examples, a network may be present but a signal associated with the network may have a strength that does not meet a threshold and accordingly can be considered absent and/or not present. That is, a network may be become available when a signal strength of the network meets or exceeds a threshold, and in some examples, sustains that signal strength at or above the threshold for a predetermined period of time.

In some examples, the event determination module 226 can determine an event based on detecting a user action. In at least one example, the event determination module 226 can determine an event based on an activation of an application and/or an interaction with the application. In at least one non-limiting example, a user can activate a banking application (e.g., to make a mobile deposit), a streaming application (e.g., to stream media content), etc. Additionally and/or alternatively, a user can interact with an application to initiate a call via Wi-Fi calling, interact with a web browser to perform a web browsing action, etc. In such examples, the event determination module 226 can determine an event.

In some examples, the event determination module 226 can determine an event based on a lapse of a predetermined period of time, at a particular frequency, etc. In other examples, the event determination module 226 can determine an event based on an express indication (e.g., user input) that an alternative network is available.

Based at least in part on determining an event, the event determination module 226 can send an indication to the contextual data determination module 228. The contextual data determination module 228 can be configured to determine contextual data. Non-limiting examples of contextual data include location data, connectivity data, user activity data, security data, service plan data, device component data, etc., as described below. In at least one example, the contextual data determination module 228 can determine contextual data responsive to receiving an indication of an occurrence of an event. In other examples, the contextual data determination module 228 can determine contextual data in near-real time and can save the contextual data in a data store (not pictured) that is associated with the device 202. In such examples, responsive to receiving an indication of an occurrence of an event, the contextual data determination module 228 can retrieve the contextual data from the data store.

In at least one example, the contextual data determination module 228 can retrieve location data associated with the device 202 to determine a location of the device 202 at the time of or within a threshold time period of the event. Additionally, in at least one example, the contextual data determination module 228 can retrieve connectivity data indicating network quality of each available network to determine connectivity data at the time of or within a threshold time period of the event. Connectivity data can indicate throughput associated with a network, latency associated with a network, signal strength of a network, etc. In at least one example, the contextual data determination module 228 can access a data log indicative of interactions between a user and the device 202 to determine user activity data at the time of or within a threshold time period of the event. The data log can indicate one or more applications that have been activated and/or are active, one or more interactions taken with respect to the one or more applications, etc.

In some examples, the contextual data determination module 228 can retrieve security data associated with available network(s) and/or application(s) to determine security data at the time of or within a threshold time period of the event. The security data can indicate levels of security associated with the available network(s) and/or levels of security required for particular applications. For instance, security data can indicate whether a network is an open network, a verified network, a private network, etc., and levels of security associated with the various types of network(s). Furthermore, security data can indicate whether application(s) are native application(s), downloaded application(s), etc., and levels of security associated with the various types of application(s). In at least one example, the contextual data determination module 228 can retrieve data associated with a service plan of the device 202 to determine service plan data at the time of or within a threshold time period of the event. The service plan can indicate an amount of data, voice calling, and/or text messaging available to the device 202, whether data, voice calling, and/or text messaging is available internationally (or outside of a home coverage area), roaming charges associated with data, voice calling, and/or text messaging internationally (or outside of a home coverage area), data transmission speeds accessible to the device 202, etc.

Additionally, in some examples, the contextual data determination module 228 can access indicators associated with state(s) of various components of the device 202 to determine device component data at the time of or within a threshold time period of the event. For instance, in an example, the contextual data determination module 228 can query an indicator associated with a battery of the device 202 to determine a useful remaining life of the battery (e.g., until it is re-charged). Various other types of contextual data can be imagined.

Based at least in part on determining contextual data, the contextual data determination module 228 can send the contextual data to the network management module 230 for processing, as described below.

The network management module 230 can be configured to determine whether to switch from a current network to an alternative network. In at least one example, the network management module 230 can access a data model 234, which can be stored in association with the device 202. The data model 234 may have been previously trained via a machine learning mechanism, as described below. Based at least in part on receiving an indication of an occurrence of an event, the network management module 230 can analyze the contextual data (received from the contextual data determination module 228) utilizing the data model 234. The data model 234 can output an indication as to whether a change to the alternative network is warranted. As described herein, the data model 234 can be trained based on user preferences determined from previous user behavior. Accordingly, the data model 234 can output a recommendation regarding a preferred network for the device 202, which can be informed based on previous user behavior.

In at least one example, the network management module 230 can utilize one or more policies to check an output of the data model 234. That is, in some examples, the network management module 230 can leverage the one or more policies to determine whether the recommendation output by the data model 234 is likely to optimize the experience of the user.

For instance, in an example, the data model 234 can recommend a switch to a Wi-Fi network (e.g., one or more other network(s) 210); however, the Wi-Fi network (e.g., one or more other network(s) 210) may be associated with throughput and/or latency that does not meet a threshold. Accordingly, by applying a policy indicating that a Wi-Fi network (e.g., one or more other network(s) 210) is to meet or exceed a threshold, the network management module 230 may determine not to effectuate a change to a Wi-Fi network (e.g., one or more other network(s) 210). Or, in an example, the data model 234 can indicate to switch to a Wi-Fi network (e.g., one or more other network(s) 210); however, the Wi-Fi network (e.g., one or more other network(s) 210) may be associated with a level of security that does not meet a threshold level of security required to perform a particular action (e.g., an online banking transaction). Accordingly, by applying a policy indicating that a Wi-Fi network (e.g., one or more other network(s) 210) is to meet or exceed a threshold level of security, the network management module 230 may determine not to effectuate a change to a Wi-Fi network (e.g., one or more other network(s) 210).

In yet another example, the data model 234 can recommend connecting to a cellular network (e.g., cellular network 206); however, a service account associated with the user may have a limited data plan and such a connection may not be prudent. Accordingly, by applying a policy that limits the use of a cellular network (e.g., cellular network 206) if such use will impact a quantity of data usage available, the network management module 230 may determine not to effectuate a change to a cellular network (e.g., cellular network 206). Or, in another example, the data model 234 can recommend connecting to a cellular network (e.g., cellular network 206); however, a service account associated with the user may be charged a roaming cost when transmitting data via the cellular network (e.g., cellular network 206). Accordingly, by applying a policy that limits the use of a cellular network (e.g., cellular network 206) if roaming charges apply, the network management module 230 may determine not to effectuate a change a cellular network (e.g., cellular network 206).

In an example where the network management module 230 determines that a change to an alternative network is warranted, the network management module 230 can effectuate a change from a current network (e.g., the network to which the device 202 is connected) to the alternative network. For instance, if the device 202 is connected to the cellular network 206, the network management module 230 can route communications through the internet 208 and/or other network(s) 210 instead of the cellular network 206. Or, if the device 202 is connected to the internet 208 and/or the other network(s) 210, the network management module 230 can route communications through the cellular network 206 instead of the internet 208 and/or the other network(s) 210. That is, the network management module 230 can route communications to a different type of network (e.g., a network associated with a different access technology). Additionally and/or alternatively, in some examples, if the device 202 is connected to a first non-cellular network (e.g., the internet 208 and/or other network(s) 210), the network management module 230 can route communications through a second non-cellular network (e.g., the internet 208 and/or other network(s) 210) instead of the first non-cellular network (e.g., the internet 208 and/or other network(s) 210). That is, the network management module 230 can route communications through a different network of a same type (e.g., a different network that is associated with a same access technology). In some examples, the network management module 230 can effectuate the change without notifying the user. In other examples, the network management module 230 can prompt the user for permission to effectuate the change.

In at least one example, the network management module 230 can determine that a user provides an explicit indication as to which network (e.g., the cellular network 206, the internet 208, and/or the other network(s) 210) the user prefers. In some examples, the user's explicit indication can be different than the output of the data model 234 and/or the determination after application of one or more policies. In at least one example, the user's explicit indication can occur after the network management module 230 effectuates the change. Responsive to determining the explicit user input, the network management module 230 can generate feedback data and send the feedback data to the server(s) 204 for use as training data, as described below.

Additionally and/or alternatively, the network management module 230 can generate feedback data indicating whether the device 202 accepts a recommendation output by the data model (e.g., utilized the network recommended) or rejects the recommendation (e.g., connected to a different network than was recommended). The feedback data can be associated with contextual data. In at least one example, the network management module 230 can generate feedback data and send the feedback data to the server(s) 204 for use as training data, as described below.

Applications are created by programmers to perform specific functionalities on device(s). The device 202 can include one or more applications 232. The application(s) 232 can perform specific functionalities on the device 202, such as, but not limited to utility, entertainment, and/or productivity functionalities. In some examples, the application(s) 232 can be built into the device 202 (e.g., telecommunication, text message, clock, camera, etc.), and in other examples, the application(s) 232 can be customized (e.g., games, news, transportation schedules, online shopping, online banking, etc.). In at least one example, a user can interact with the device 202 to activate one or more applications 232. Additionally, the user can interact with the one or more applications 232 to perform various functionalities.

The radio hardware 224 provides wireless connectivity capabilities, such as connecting to the base station 212, a Wi-Fi network, or other wireless networks. The radio hardware 224 can include or be incorporated into processors, ASICs, programmable circuits such as FPGAs, or in other ways.

As described above, in at least one example, device 202 can connect to the cellular network 206 via a base station 212. A base station 212 can correspond to a fixed-location transceiver, which can also be called a cell site. As described above, some devices may not be capable of connecting to the cellular network 206 via a base station (e.g., base station 212). In such examples, a such devices can register with the cellular network 206 through the internet 208 using a unique identifier, such as an IMPI (IP multimedia private identity), an IMPU (IP multimedia public identity), a globally routable user agent URI (GRUU), or other. In at least one example, these identifiers can take the form of a telephone number.

As described above, the device 202 can communicate with the server(s) 204 via the cellular network 206, the internet 208, and/or the one or more other networks 210. Each of the server(s) 204 can be any type of server, such as a network-accessible server. In various examples, each of the server(s) 204 can be associated with one or more processors 234, computer-readable media 236, and network hardware 238. The processor(s) 234 can have the same and/or similar structure and/or function as the processor(s) 220, described above.

Depending on the exact configuration and type of the server(s) 204, the computer-readable media 236 can include computer storage media and/or communication media. The computer-readable media 236 can have the same and/or similar structure and/or function as the computer-readable media 222, described above. The computer-readable media 236 can include one or more modules and data structures including, for example, a training module 240 and a data communication module 242. The one or more modules and data structures can be in the form of stand-alone applications, productivity applications, an operating system component, or any other application or software module having data items that facilitate training a data model and exchanging communication(s) between the device 202 and the server(s) 204, as described herein.

In at least one example, the server(s) 204 can be communicatively coupled with a database 244, as illustrated in FIG. 2. In alternative examples, the database 244 can be integrated with the server(s) 204. In either example, the server(s) 204 and the database 244 can be associated with a service provider 246. In at least one example, the service provider 246 can provision telecommunication services to the device 202. The database 244 can include data model(s) 248 and training data 250.

The training module 240 can be configured to train one or more data models 248. In an example, a data model can be configured to determine whether a network change is warranted based on contextual data associated with an event. In at least one example, training module 240 may utilize a machine learning mechanism to build and/or modify a data model from example inputs that can be utilized to make predictions or decisions. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In at least one example, the training module 240 can access the training data 250. The training data 250 can indicate network data indicating network usage associated with one or more networks and contextual data associated with the network usage. In some examples, the training module 240 can receive a portion of the training data 250 from the device 202. In such examples, the portion of the training data 250 can indicate when the device 202 has changed from a first network to a second network and contextual data associated with such change(s). That is, the portion of the training data 250 associated with the device 202 can indicate network usage patterns of the device 202. In additional and/or alternative examples, a portion of the training data 250 can be received from one or more other devices 252. In such examples, the portion of the training data 250 can indicate when individual devices of the one or more other devices 252 have changed from a first network to a second network and contextual data associated with such change(s). That is, the portion of the training data 250 associated with the one or more other devices 252 can indicate network usage patterns of the one or more other devices 252.

The training module 240 can leverage the machine learning mechanism to build and/or modify data model(s) 248, which can be stored in the database 244. In some examples, a data model of the data model(s) 248 can be representative of network preference(s) of a general population of users (e.g., all user(s) that have service accounts with the service provider 246). In such examples, the training data 250 can include network data and corresponding contextual data for the general population of users. In other examples, a data model of the data model(s) 248 can be representative of network preference(s) of a group of users that share a characteristic (e.g., a cohort of users). A characteristic can correspond to a service plan, a user profile type (e.g., consumer, corporate, etc.), a geographic location, etc. In such examples, the training data 250 can include network data and corresponding contextual data for a group of users that share the characteristic. In additional and/or alternative examples, a data model of the data model(s) 248 can be representative of network preference(s) of a particular user. In such examples, the training data 250 can include network data and corresponding contextual data for the particular user.

The training module 240 can leverage a machine learning mechanism to build and/or modify a data model that can be utilized to make predictions or decisions as to which network, of two or more available networks, is a preferred network for the user. That is, the machine learning mechanism can train a data model to identify usage patterns in user behavior and the data model can analyze contextual data to output a recommendation based on the identified usage patterns.

As a non-limiting example, the training data 250 can indicate that one or more users prefer to connect their device(s) to a Wi-Fi network (e.g., one or more other network(s) 210) when they are in their homes but prefer to connect their device(s) to a cellular network (e.g., cellular network 206) when they are in a coffee shop. Accordingly, the data model can be trained to output a recommendation to connect via a Wi-Fi network (e.g., one or more other network(s) 210) when contextual data indicates that a user is at his or her home (e.g., a geographical location corresponding to his or her home) and to connect via a cellular network (e.g., cellular network 206) when contextual data indicates that the user is at a coffee shop (e.g., a geographical location corresponding to the coffee shop).

Or, as another non-limiting example, the training data 250 can indicate that a user uses a first Wi-Fi connection (e.g., to one or more other network(s) 210) when browsing various webpages and the user uses second Wi-Fi connection (e.g., to a different network of the one or more other network(s) 210) for real-time communication (e.g., voice calling, video calling, etc.). Accordingly, the data model can be trained to output a recommendation to connect via the first Wi-Fi network (e.g., one or more other network(s) 210) when contextual data indicates that a user is browsing various webpages and to connect via the second Wi-Fi network (e.g., the different network of the one or more other network(s) 210) when contextual data indicates that the user is sending and/or receiving a call via real-time communication.

In some examples, certain applications can perform better on certain types of networks (and accordingly, such networks are preferred by one or more users). For instance, in a non-limiting example, the training data 250 can indicate that a user prefers to use a first streaming application with a Wi-Fi connection (e.g., to one or more other network(s) 210) and a second streaming application with a cellular connection (e.g., to the cellular network 206). Accordingly, the data model can be trained to output a recommendation to connect via a Wi-Fi network (e.g., one or more other network(s) 210) when contextual data indicates that a user launches or otherwise interacts with the first streaming application. And, the data model can be trained to output a recommendation to connect via a cellular network (e.g., the cellular network 206) when contextual data indicates that a user launches or otherwise interacts with the second streaming application.

In other examples, the data model can take security concerns into account when recommending a network to the device 202. For instance, in another non-limiting example, the training data 250 can indicate that a user prefers to utilize a cellular network (e.g., the cellular network 206) when interacting with a banking application (e.g., for enhanced security). Accordingly, the data model can be trained to output a recommendation to connect via the cellular network (e.g., the cellular network 206) when the contextual data indicates that the user activates a banking application.

Additional and/or alternative examples can be imagined. In at least one example, data model(s) can be trained based on combinations of contextual data. For instance, in some examples, the training module 240 can utilize location data, connectivity data, user activity data, security data, service plan data, device component data, etc., for training the data model(s) and accordingly, the data model(s) can analyze various types of contextual data in outputting a network recommendation.

The data communication module 242 can be configured to exchange data with one or more devices (e.g., device 202, other device(s) 252, etc.). In at least one example, the data communication module 242 can provide a data model (e.g., data model 234) to the device 202. In some examples, the data model can be a generic data model (e.g., trained on network data and corresponding contextual data for the general population of users). Overtime, the training module 240 can refine a data model so that it is more specific to the user of the device 202. In such examples, the data communication module 242 can send updated data model(s) to the device 202. Additionally and/or alternatively, the data communication module 242 can send a data model that is specific to the user and/or a group of users that share a characteristic with the user to the device 202. In such examples, the data communication module 242 can send updated data model(s) to the device 202, which overtime can become more specific to the user of the device 202. In at least one example, the data communication module 242 can send updated data model(s) to the device 202 at a particular frequency, after a lapse of a predetermined period of time, after an indication of an update, etc.

In some examples, the data communication module 242 can receive feedback data from the device 202. As described above, the feedback data can indicate whether the device 202 accepts a recommendation output by the data model (e.g., utilized the network recommended) or rejects the recommendation (e.g., connected to a different network than was recommended). The feedback data can be associated with contextual data. In some examples, the feedback data can indicate that a user explicitly rejects the recommendation (e.g., provided input to connect to a network other than the network that was recommended). The data communication module 242 can provide the feedback data to the training module 240 for updating the data model(s). Additionally, the data communication module 242 can provide the feedback data to the database 244 for storage in the training data 250.

The network hardware 238 can provide wired or wireless networking capabilities to the server(s) 204. The network hardware 238 can include or be incorporated into processors, ASICs, programmable circuits such as FPGAs, or in other ways.

Figure 3:
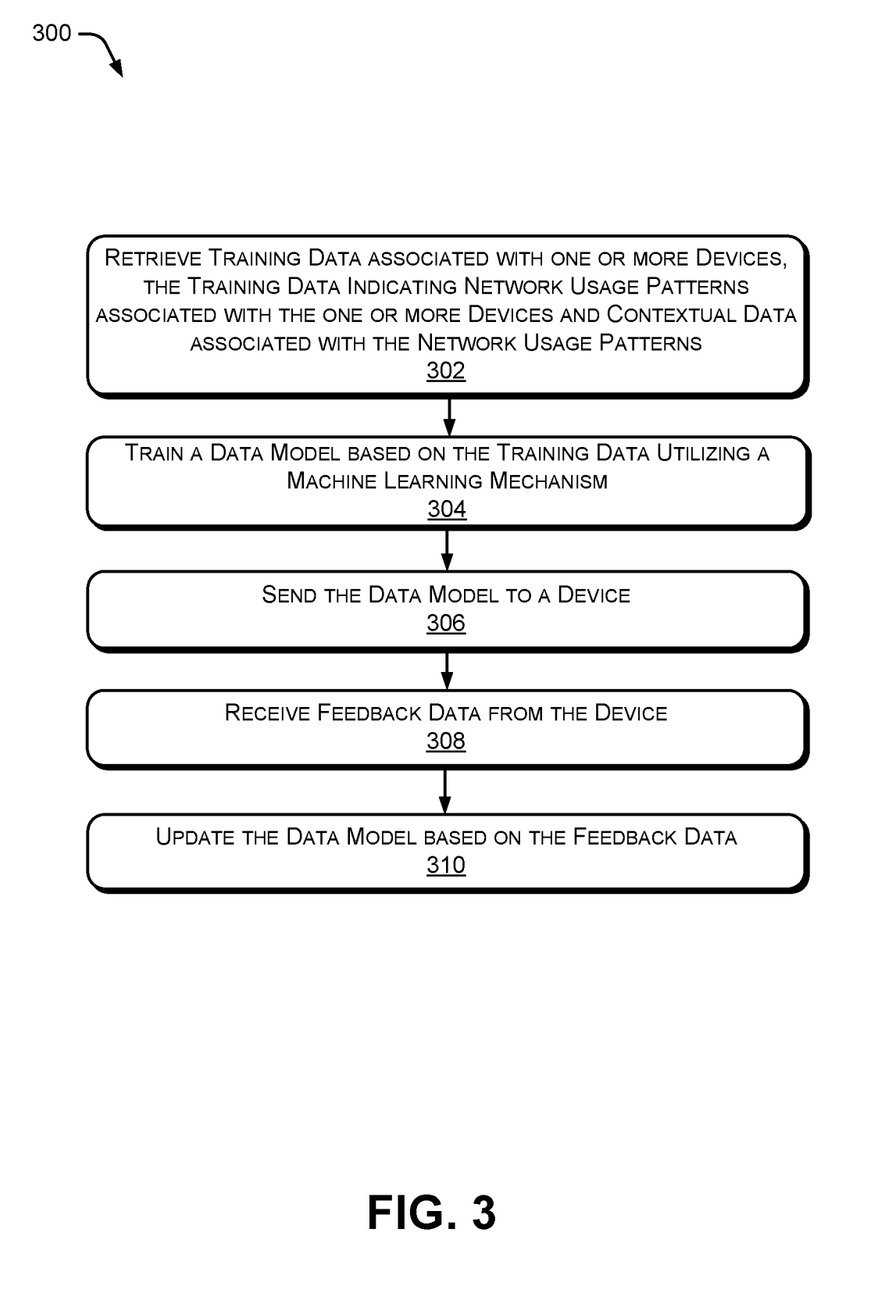
FIG. 3 illustrates an example process for training a data model configured to analyze new contextual data associated with an event to determine whether a network change is warranted.
Figure 4:
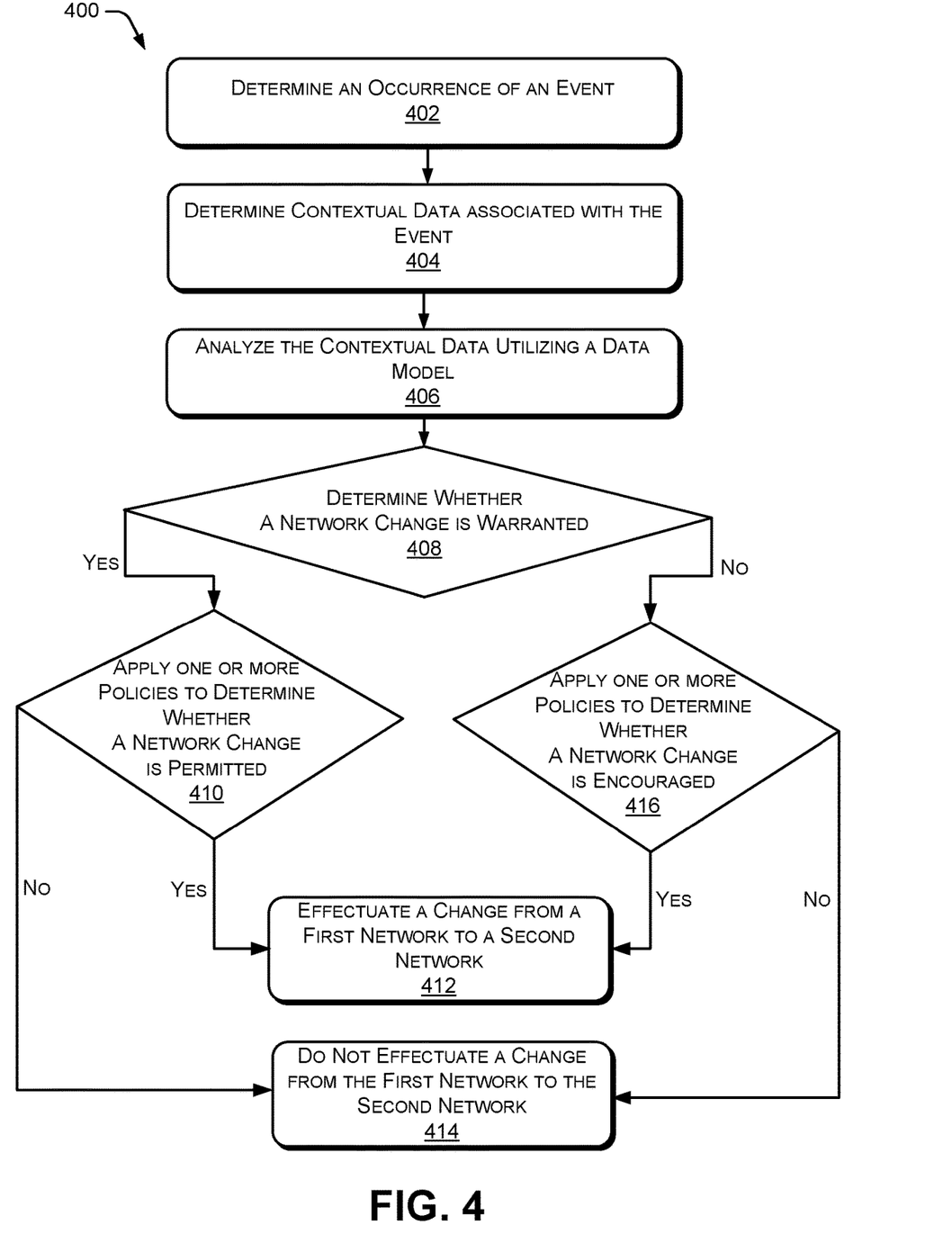
FIG. 4 illustrates an example process for determining whether, responsive to an event, a change from a first network to a second network is warranted.

FIGS. 3 and 4 describe example processes for facilitating intelligent event-based network routing. The example processes are described in the context of the environment of FIG. 2, but is not limited to that environment.

The processes described above in association with FIGS. 3 and 4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

FIG. 3 illustrates an example process 300 for training a data model configured to analyze new contextual data associated with an event to determine whether a network change is warranted.

Block 302 illustrates retrieving training data associated with one or more devices, the training data indicating network usage patterns associated with the one or more devices and contextual data associated with the network usage patterns. As described above, in at least one example, the training module 240 can access the training data 250. The training data 250 can indicate network data indicating network usage associated with one or more networks and contextual data associated with the network usage. In some examples, the training module 240 can receive a portion of the training data 250 from the device 202. In such examples, the portion of the training data 250 can indicate when the device 202 has changed from a first network to a second network and contextual data associated with such change(s). That is, the portion of the training data 250 associated with the device 202 can indicate network usage patterns of the device 202. In additional and/or alternative examples, a portion of the training data 250 can be received from one or more other devices 252. In such examples, the portion of the training data 250 can indicate when individual devices of the one or more other devices 252 have changed from a first network to a second network and contextual data associated with such change(s). That is, the portion of the training data 250 associated with the one or more other devices 252 can indicate network usage patterns of the one or more other devices 252.

The training module 240 can retrieve different portions of the training data 250 depending on which data model(s) the training module 240 is training. For instance, the training module 240 can retrieve at least a portion of the training data 250 that is associated with a plurality of devices to train a data model that is generally applicable (e.g., representative of preferences of a general population of users). Or, the training module 240 can retrieve at least a portion of the training data 250 that is associated with a plurality of devices corresponding to a plurality of users that share at least one characteristic to train a data model that is applicable to other users that share the at least one characteristic (e.g., representative of preferences of a cohort of users). Furthermore, the training module 240 can retrieve at least a portion of the training data 250 that is associated with the device 202 to train a data model that is applicable to the user (e.g., representative of preferences of the user).

Block 304 illustrates training a data model based on the training data utilizing a machine learning mechanism. As described above, the training module 240 can be configured to train one or more data models 248. In at least one example, the training module 240 may utilize a machine learning mechanism to build and/or modify a data model from example inputs (e.g., the training data 250) that can be utilized to make predictions or decisions. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The trained data model can be utilized to make predictions or decisions as to which network, of two or more available networks, is a preferred network for a user, a cohort of users, or a general population of users. That is, the machine learning mechanism can train a data model to identify usage patterns in user behavior and the data model can analyze contextual data to output a recommendation based on the identified usage patterns.

Block 306 illustrates sending the data model to a device. In at least one example, the data communication module 242 can provide a data model (e.g., data model 234) to the device 202. In some examples, the data model can be a generic data model (e.g., trained based on network data and corresponding contextual data for the general population of users). Additionally and/or alternatively, the data communication module 242 can send a data model that is specific to the user and/or a group of users that share at least one characteristic with the user to the device 202.

Block 308 illustrates receiving feedback from the device. In some examples, the data communication module 242 can receive feedback data from the device 202, as described above. As described above, the feedback data can indicate whether the device 202 accepts a recommendation output by the data model (e.g., utilized the network recommended) or rejects the recommendation (e.g., connected to a different network than was recommended). The feedback data can be associated with contextual data. In some examples, the feedback data can indicate that a user explicitly rejects the recommendation (e.g., provided input to connect to a network other than the network that was recommended). The data communication module 242 can provide the feedback data to the training module 240.

Block 310 illustrates updating the data model based on the feedback data. In at least one example, the training module 240 can leverage the feedback data to retrain the data model(s) 248. For instance, in some examples, the training module 240 can leverage the feedback data to adjust weights or other values associated with various contextual data to refine the data model(s). In some examples, via multiple iterations of retraining a data model, the training module 240 can train a data model so that it is more specific to a particular user.

FIG. 4 illustrates an example process 400 for determining whether, responsive to an event, a change from a first network to a second network is warranted.

Block 402 illustrates determining an occurrence of an event. The event determination module 226 can determine an occurrence of an event. As described above, an event can correspond to a change in a location of the device 102, a change to an availability of a network, a user action, an activation of an application, etc. In some examples, the event determination module 226 can determine an event based on a lapse of a predetermined period of time, at a particular frequency, etc. In other examples, the event determination module 226 can determine an event based on an express indication (e.g., user input) that an alternative network is available.

Block 404 illustrates determining contextual data associated with the event. As described above, the contextual data determination module 228 can be configured to determine contextual data. Non-limiting examples of contextual data include location data, connectivity data, user activity data, security data, service plan data, device component data, etc. In at least one example, the contextual data determination module 228 can determine contextual data responsive to receiving an indication of an occurrence of an event. In other examples, the contextual data determination module 228 can determine contextual data in near-real time and can save the contextual data in a data store (not pictured) that is associated with the device 202. In such examples, responsive to receiving an indication of an occurrence of an event, the contextual data determination module 228 can retrieve the contextual data from the data store.

Block 406 illustrates analyzing the contextual data utilizing a data model. In at least one example, the network management module 230 can access a data model 234, which can be stored in association with the device 202. Based at least in part on receiving an indication of an occurrence of an event, the network management module 230 can analyze the contextual data (received from the contextual data determination module 228) utilizing the data model 234.

Block 408 illustrates determining whether a network change is warranted. Based at least in part on analyzing the contextual data, the data model 234 can output an indication as to whether a change to an alternative network is warranted. As described herein, the data model 234 can be trained based on user preferences determined from previous user behavior. Accordingly, the data model 234 can output a recommendation regarding a preferred network for the device 202, which can be informed based on previous user behavior.

Based at least in part on determining a network change is warranted, the network management module 230 can apply one or more policies to determine whether a network change is permitted, as illustrated in block 410. The one or more policies can correspond to predefined policies that are provided by a user, a service provider, etc. In an example, a policy can indicate that a recommended network is to be associated with a threshold level of throughput and/or latency than an alternative network and/or a recommended network is to have more throughput and/or less latency than an alternative network. Or, a policy can indicate that a connection to a recommended network cannot significantly deplete or exhaust data available to the device 202. Additionally and/or alternatively, a policy can indicate that a recommended network cannot cause additional and/or excess charges for a user (e.g., the recommended network is associated with roaming charges and the device 202 is roaming) than an alternative network. Furthermore, a policy can indicate that a recommended network is to be associated with a level of security that is greater than a level of security required to perform a particular action (e.g., an online banking transaction, etc.). Additional and/or alternative policies can be imagined.

Based at least in part on determining that a network change is permitted, the network management module 230 can effectuate a change from a first network to a second network, as illustrated in block 412. That is, based at least in part on determining that a policy is not violated, the network management module 230 can effectuate a change from a first network to a second network. Based at least in part on determining that a network change is not permitted, the network management module 230 can refrain from effectuating a change from the first network to the second network, as illustrated in block 414. That is, based at least in part on determining that a policy is violated, the network management module 230 can refrain from effectuating a change from a first network to a second network.

Based at least in part on determining a network change is not warranted, the network management module 230 can apply one or more policies to determine whether a network change is encouraged, as illustrated in block 416. For instance, the network management module 230 can utilize the one or more policies to determine whether a network change is encouraged despite the recommendation output from the network management module 230. As an example, a policy can indicate that a recommended network is to be associated with a threshold level of throughput and/or latency than an alternative network and/or a recommended network is to have more throughput and/or less latency than an alternative network, as described above. If an alternative network is associated with more throughput and/or less latency than the recommended network, the network management module 230 can determine that a network change is encouraged to improve the experience of the user.

Based at least in part on determining that a network change is encouraged, the network management module 230 can effectuate a change from the first network to the second network, as illustrated in block 412. That is, based at least in part on determining that a policy is violated by refraining from changing to the second network, the network management module 230 can effectuate a change from a first network to a second network. Based at least in part on determining that a network change is not warranted or encouraged, the network management module 230 can refrain from effectuating a change from the first network to the second network, as illustrated in block 414. That is, based at least in part on determining that a policy is not violated by refraining from changing to the second network, the network management module 230 can refrain from effectuating a change from the first network to the second network.

In an example where the network management module 230 determines that a change to the second network is warranted and permitted and/or encouraged, the network management module 230 can effectuate a change from the first network to the second network. For instance, if device 202 is connected to the cellular network 206, the network management module 230 can route communications through the internet 208 and/or other network(s) 210 instead of the cellular network 206. Or, if device 202 is connected to the internet 208 and/or the other network(s) 210, the network management module 230 can route communications through the cellular network 206 instead of the internet 208 and/or the other network(s) 210. That is, the network management module 230 can route communications to a different type of network (e.g., a network associated with a different access technology). Additionally and/or alternatively, in some examples, if the device 202 is connected to a first non-cellular network (e.g., the internet 208 and/or other network(s) 210), the network management module 230 can route communications through a second non-cellular network (e.g., the internet 208 and/or other network(s) 210) instead of the first non-cellular network (e.g., the internet 208 and/or other network(s) 210). That is, the network management module 230 can route communications through a different network of a same type (e.g., a different network associated with a same access technology). In some examples, the network management module 230 can effectuate the change without notifying the user. In other examples, the network management module 230 can prompt the user for permission to effectuate the change.

While process 400 includes the application of one or more policies in blocks 410 and 416, in some examples, such policies can be incorporated into the training data 250 and leveraged for training the data model. In such examples, the network management module 230 can refrain from applying policies to determine whether a network change is permitted or encouraged, as such considerations can be made via application of the data model to the contextual data. That is, in some examples, the network management module 230 can decide whether to switch networks without applying the one or more policies.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
one or more processors; and
one or more non-transitory computer-readable media storing instructions executable by the one or more processors, wherein the instructions program the one or more processors to perform actions comprising:
receiving, from a device operated by a user, network data indicating network usage of one or more networks employing different access technologies;
receiving, from the device, contextual data associated with the network usage and an event, the contextual data indicating at least one of location data, connectivity data, or user activity data and the event comprising at least a user action that is associated with the contextual data;
receiving additional network data and additional contextual data from a plurality of other devices operated by a plurality of other users during a plurality of additional events;
aggregating the network data, the additional network data, the contextual data, and the additional contextual data to generate aggregated data;
analyzing the aggregated data to train a data model, the data model configured to:
determine, based at least on the aggregated data, one or more network usage patterns associated with at least the device operated by the user; and
analyze, based at least on the one or more network usage patterns, new contextual data associated with a new event to determine whether a network change is warranted; and
providing the data model to a particular device to enable the particular device to determine when to change from a first network to a second network having a different access technology than the first network, wherein the particular device is a user device configured to receive the data model and utilize the data model in response to the new event.

2. The system as claim 1 recites, the actions further comprising determining that the user and the plurality of other users share at least one characteristic.

3. The system as claim 1 recites, wherein analyzing the aggregated data to train the data model is based at least in part on a machine learning mechanism.

4. The system as claim 1 recites, the actions further comprising:
- receiving, from the particular device, feedback data indicating that, responsive to a recommended change from the first network to the second network, a particular user of the particular device rejected the recommended change; and
- updating the data model based at least in part on the feedback data.

5. The system as claim 1 recites, wherein:
- the first network is a cellular network and the second network is a Wi-Fi network; or
- the first network is a Wi-Fi network and the second network is a cellular network.

6. A user device comprising:
- a database storing a data model trained based at least on historical data associated with a user of the user device, the data model configured to analyze contextual data associated with one or more events and determine whether a change between a first network and a second network is warranted;
- one or more processors; and
- one or more non-transitory computer-readable media storing instructions executable by the one or more processors, wherein the instructions program the one or more processors to perform actions comprising:
  - determining an occurrence of an event that includes a user action associated with the user device;
  - determining additional contextual data associated with the event;
  - analyzing the additional contextual data based at least in part on the data model;
  - determining, based at least in part on an output of the data model, a usage pattern associated with the additional contextual data and the user of the user device; and
  - determining, based at least in part on the usage pattern, a change from the first network to the second network is to occur for the user device.

7. The user device as claim 6 recites, wherein the event further comprises a change in location of the user device.

8. The user device as claim 6 recites, wherein the event further comprises a change to an availability of the second network.

9. The user device as claim 6 recites, wherein the user action is performed by the user and includes at least one of:
- providing a user input associated with the user device;
- launching an application;
- initiating a video call;
- opening a web browser; or
- performing a web browsing action.

10. The user device as claim 6 recites, wherein the event further comprises a lapse of a predetermined period of time.

11. The user device as claim 6 recites, wherein the additional contextual data comprises at least one of:
- location data indicating a location of the user device;
- connectivity data indicating a first quality of the first network and a second quality of the second network;
- user activity data indicating activity of the user with one or more applications associated with the user device;
- security data indicating security associated with at least one of the first network, the second network, or the one or more applications;
- service plan data associated with a service plan of the user device, the service plan indicating at least one of roaming information or data usage information; or
- device component data indicating at least a useful battery life of a battery of the user device.

12. The user device as claim 6 recites, the actions further comprising:
- sending a rejection of the change from the first network to the second network;
- generating feedback data based on the rejection; and
- sending the feedback data to one or more servers for updating the data model.

13. The user device as claim 6 recites, wherein:
- the first network is a cellular network and the second network is a Wi-Fi network; or
- the first network is a Wi-Fi network and the second network is a cellular network.

14. A computer-implemented method comprising:
- storing, via a database of a user device, a data model trained based at least on historical data associated with a user of the user device, the data model configured to analyze contextual data associated with one or more events and determine whether a change between a first network and a second network is warranted;
- determining, by the user device connected to a first network, an occurrence of an event associated with a user action and the user device;
- determining contextual data associated with the event;
- analyzing the contextual data based at least in part on the data model to determine whether a change to a second network is warranted, the data model being trained based on historical network usage data indicating one or more network usage patterns associated with the user device; and
- determining a change from the first network to the second network is to occur for the user device.

15. The computer-implemented method as claim 14 recites, further comprising:
- determining a change in a location of the user device; and
- determining the occurrence of the event based on the user action changing the location of the user device.

16. The computer-implemented method as claim 14 recites, further comprising:
- determining that the second network, which was previously not accessible, is accessible; and
- determining the occurrence of the event based on the second network becoming accessible.

17. The computer-implemented method as claim 14 recites, further comprising:
- determining that the user action includes a user of the user device activating an application; and
- determining the occurrence of the event based on an activation of the application.

18. The computer-implemented method as claim 14 recites, wherein the contextual data comprises at least one of:
- location data indicating a location of the user device;
- connectivity data indicating a first quality of the first network and a second quality of the second network;
- user activity data indicating user activity with one or more applications associated with the user device;
- security data indicating security associated with at least one of the first network, the second network, or the one or more applications;

service plan data associated with a service plan of the user device, the service plan data indicating at least one of roaming information or data usage information; or device component data indicating at least a useful battery life of a battery of the user device.

19. The computer-implemented method as claim 14 recites, wherein an output of the data model indicates that a change to the second network is warranted, and the method further comprises:

determining that the second network is associated with at least one of less throughput or more latency than the first network; and determining to refrain from effectuating the change from the first network to the second network based at least in part on the second network being associated with at least one of less throughput or more latency than the first network.

20. The computer-implemented method as claim 14 recites, wherein an output of the data model indicates that a change to the second network is warranted, and the method further comprises:

determining a first security level associated with the second network is below a second security level required to perform a particular action; and determining to refrain from effectuating the change from the first network to the second network based at least in part on the first security level being below the second security level.

\* \* \* \* \*